PUSH-PULL PARALLEL AMPLIFIER INCLUDING CURRENT BALANCING MEANS

Filed July 18, 1963

WITNESSES:
Bernard R. Gieguey
James F. Young

INVENTORS
John R. Boykin and
Heber J. Morrison.
BY
William L. Gates
ATTORNEY

United States Patent Office 3,254,302

Patented May 31, 1966

3,254,302

PUSH-PULL PARALLEL AMPLIFIER INCLUDING CURRENT BALANCING MEANS

John R. Boykin, Glen Burnie, and Heber J. Morrison, Ellicott City, Md., assignors to Westinghouse Electric Corporation, Pittsburgh, Pa., a corporation of Pennsylvania Filed July 18, 1963, Ser. No. 296,014

5 Claims. (Cl. 330—15)

Figure 1:
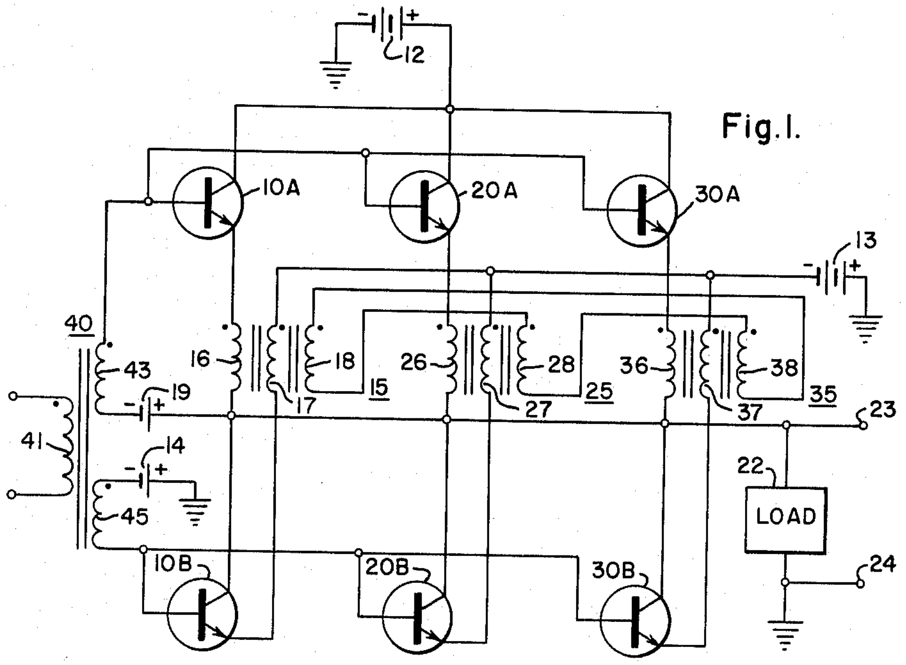

This invention relates, in general, to power amplifying circuitry and more particularly to a means for balancing the collector currents of a plurality of transistors driven in parallel in a push-pull amplifier operating into a common load.

The use of transistors to generate alternating currents at high power levels necessarily requires the use of a large number of transistors operated in series or parallel, inasmuch as the power handling capability of each is limited. When a group of transistors is operated in parallel, some steps must be taken to cause them to share the load equally. One method of accomplishing this is to choose transistors having forward current gain parameters (beta in the case for a common emitter connection) that are very nearly equal so that with equal drive currents applied to each of the base electrodes, the current drawn by the respective collectors will be nearly equal. This method is expensive because it involves the use of selected transistors for which one has to pay a premium price.

Another method of balancing the collector current is to cause the drive current of each transistor to be inversely proportional to its current gain (beta). This can be done by using individual bias voltages, or individual series impedances in the drive circuit to the separate base circuits, with each voltage or impedance selected or trimmed to equalize the collector currents. This method has the disadvantage that no transistor can be replaced without trimming or reselecting the voltage applied to, or impedance in, the base circuit. Another disadvantage of this method of equilizing is that the balance is necessarily made at a single operating temperature and operating level. If the temperature varies or the operating power or load impedance is varied, baalnce is no longer assured.

A third means of adjusting the drive to equalize the collector currents is to use inverse current feedback around each transistor. This is the method generally employed and is usually implemented by connecting an individual resistance in series with the emitter of each transistor. The larger the resistance used, the more nearly the collector currents will balance. Due to the losses involved in these added resistances, however, the efficiency of the stage rapidly falls off as the resistance is increased. In actual practice, one must seriously compromise between the balance and efficiency. Another disadvantage of the above circuit for many applications is that as these emitter resistances are increased the voltage drive required to maintain the base current in the stage also increases.

A copending patent application, Serial No. 296,013 by John R. Boykin, assigned to the same assignee, filed July 18, 1963, and concurrently herewith, describes and claims a current balancing circuit for a plurality of parallelly connected amplifying devices. However, the power delivered thereby to a commonly connected load is limited. It is desirable when attempting to increase the delivered power by push-pull arrangements to avoid overdriving of the current balancing circuit while at the same time avoiding the expense of unnecessary components.

It is an object of the present invention therefore to provide an improved means, for balancing the load currents in a push-pull, parallel connected amplifier.

It is another object of the present invention to provide a push-pull amplifier in which a plurality of transistors, driven in parallel and operated into a common load, are made to share the load substantially equally notwithstanding non-uniformity of individual transistor characteristics.

It is still a further object of the present invention for providing a current balancing circuit for a plurality of push-pull amplifiers coupled and driven in parallel and operating into a common load.

Another object of the present invention is to provide a current balancing circuit for a plurality of push-pull amplifiers which allows use of smaller, less expensive magnetic cores.

A more specific object of the present invention is to provide a current balancing circuit for a plurality of push-pull amplifiers which avoids saturation of the magnetic cores utilized therein.

Briefly, the subject invention comprises a plurality of current transformers connected in circuit combination with a plurality of parallelly connected push-pull amplifiers utilizing transistors on each side of the amplifier. One current transformer is connected to each push-pull circuit and comprises at least three windings wound on a single core with one winding of the transformer connected in each side of the respective push-pull amplifier such that a winding appears in the emitter circuit of each side of the push-pull amplifier. The third winding of each transformer is connected in series circuit relationship to all of the other third windings in a series aiding circuit combination which arrangement will automatically cause the operating conditions of each push-pull amplifier to adjust with respect to the other push-pull amplifiers until the net currents through any individual circuit will be substantially equal irrespective of differences in the respective beta of the transistors utilized. The series aiding connection of the third windings of the plurality of current transformers force the currents to be equal due to the induced E.M.F. in the respective windings connected to the emitter electrodes of the transistors.

Figure 2:
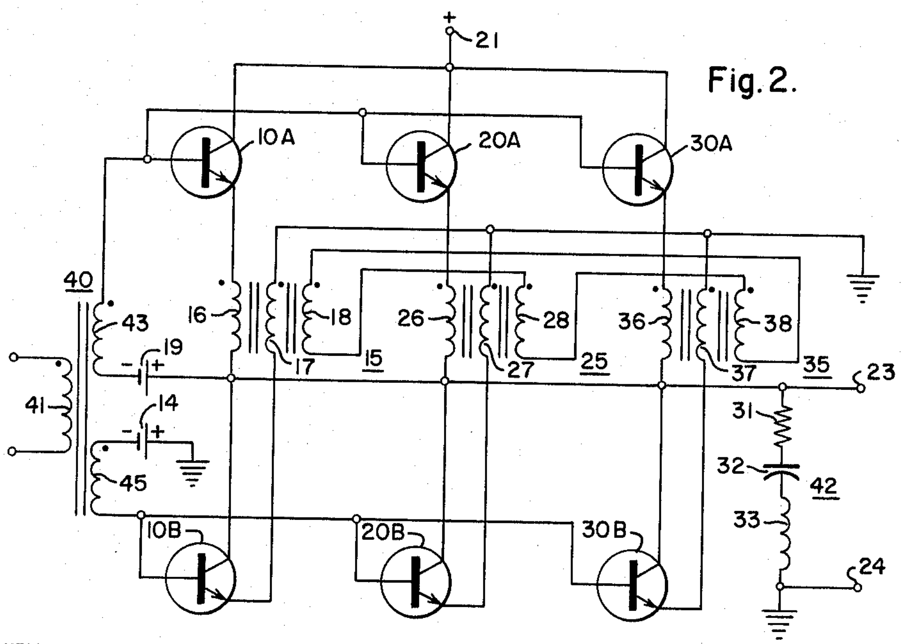

Other objects and advantages of the present invention will become more apparent as the following detailed description proceeds when considered in conjunction with the accompanying drawing, in which:

FIGURE 1 is a schematic diagram of a first embodiment of the present invention; and FIG. 2 is a schematic diagram of a second embodiment of the present invention.

Attention is now directed to FIGURE 1. Shown therein is three push-pull amplifiers connected in parallel and operating into a common load 22. The first push-pull circuit is comprised of a pair of transistors 10A and 10B in combination with current transformer 15, the second push-pull amplifier is comprised of a second pair of transistors 20A and 20B in combination with transformer 25, and the third is comprised of a third pair of transistors 30A and 30B in combination with transformer 35. One side of the push-pull parallel amplifier thus formed includes the transistors 10A, 20A and 30A while the other side of the amplifier includes transistors 10B, 20B and 30B. Alternatively the embodiment of FIG. 1 described as comprising three separate push-pull amplifiers connected in parallel, could be described as a single push-pull amplifier having each side composed of a plurality of transistors parallelly connected and driven push-pull from a common source. Regardless of the point of view taken, the transistors on each side of the parallel amplifier all have their collectors connected together and likewise have their bases connected in common; however, the emitters each are connected to one side of a winding of one of a plurality of transformers.

More particularly, the collector electrodes of transistors 10A, 20A, and 30A are commonly connected to the positive terminal of a D.C. power source 12. The negative terminal of the D.C. power source 12 is returned to a point of reference potential illustrated and hereinafter referred to as ground. The base electrodes of transistors 10A, 20A and 30A are commonly connected to one end of a secondary winding 43 of input transformer 40. The emitter electrode of transistor 10A is connected to one end of winding 16 of transformer 15. Likewise, the emitter electrodes of transistors 20A and 30A are respectively connected to the same ends of windings 26 and 36. The opposite ends of windings 16, 26 and 36 are commonly connected to one end of the load 22 and an output terminal 23 of output terminals 23 and 24. The other end of the load 22 is returned to ground as well as the other output terminal 24.

It should be pointed out that the transformers 15, 25 and 35 are each comprised of three windings wound on a single core. Specifically, transformer 15 is comprised of windings 16, 17 and 18, transformer 25 is comprised of transformers 26, 27 and 28, and transformer 35 is comprised of windings 36, 37 and 38 respectively. Additionally, it should be pointed out that the three windings of each transformer are poled with respect to one another so that the end terminals of like instantaneous polarity are designated by a dot associated therewith. For example, should the end terminal of winding 16 bearing the polarity dot have an instantaneous positive polarity with respect to its opposite end terminal, the ends of windings 17 and 18 having the polarity dots would also exhibit a positive instantaneous polarity with respect to their respective opposite ends. In connection therewith, it should be noted that the ends of windings 16, 26 and 36 having the same polarity (black dot) are connected to the emitter electrodes of transistors 10A, 20A and 30A respectively. A D.C. base bias supply source 19 is coupled to the bases of transistors 10A, 20A and 30A through the secondary winding 43 of input transformer 40 such that the negative terminal is connected to the one end of the winding 43 while the positive terminal thereof is connected to the common connection of the windings 16, 26 and 36. The polarity of the source 19 is such to operate the circuit Class B, C, or S (supersaturated) in which case the bias is zero or negative. If Class A operation is desired, the polarity of the source 19 would be reversed so that a positive bias is applied to the respective bases.

On the other half of the parallel push-pull amplifier disclosed in FIG. 1 are transistors 10B, 20B and 30B parallelly connected such that the base electrodes are commonly connected to one side of the secondary winding 45 of input transformer 40 while the collector electrodes thereof are commonly connected to the side of the load 22 which is connected to output terminal 23. The emitter electrode of transistor 10B is connected to one end terminal of winding 17 of transformer 15, that end (no dot) being the opposite terminal from the one bearing the polarity dot. The emitter of transistor 20B is connected to one end terminal (no dot) of winding 27 and finally the emitter electrode of transistor 30B is connected to one end terminal (no dot) of winding 37 of transformer 35. The ends of windings 17, 27 and 37 having the polarity dot are commonly connected to the negative terminal of D.C. power source 13. The D.C. power sources 12 and 13 respectively supply the necessary supply potentials required for operation of the plurality of transistors. Associated with the common base electrodes of transistors 10B, 20B and 30B is a D.C. base bias supply source 14 whose negative terminal is connected thereto through the secondary winding 45 of input transformer 40. Again the polarity is such to establish Class B, C, or S (supersaturated) operation.

Secondary windings 18, 28 and 38 of transformers 15, 25 and 35, respectively, are connected in a series aiding circuit such that the end terminal of winding 18 having the polarity dot (dot) is connected to the opposite end terminal (no dot) of winding 38. Likewise, the end terminal (dot) of winding 38 is connected in series to the end terminal (no dot) of winding 28 and the end terminal (dot) of winding 28 is connected to the opposite end terminal (no dot) of winding 18. The purpose of this connection will be subsequently explained. In operation, collector current flows, for example with respect to transistor 10A from the collector electrode through its respective emitter electrode and consequently through winding 16 and likewise the collector current of transistor 10B is made to flow through the winding 17. Similarly, with respect to transistors 20A and 20B, the collector current flows through their respective emitter electrodes and through windings 26 and 27, respectively. Additionally the collector currents of transistors 30A and 30B are made to flow through windings 36 and 37 respectively.

An input signal applied to the primary winding 41 of input transformer 40 is simultaneously applied to both sides of the circuit. However, the secondary windings 43 and 45 connected to the respective base electrodes are oppositely poled with respect to one another as indicated by the polarity dots. An input signal drives one-half of the plurality of push-pull input circuits including transistors 10A, 20A and 30A during one-half cycle whereas the other half of the plurality of parallelly connected push-pull circuits having transistors 10B, 20B and 30B are operated during the other half cycle, resulting in the push-pull operation which is well known to those skilled in the art.

It should also be pointed out that the transistors 10A and 10B, transistors 20A and 20B, and transistors 30A and 30B, are coupled in series across the D.C. supplies 12 and 13 through the respective transformer windings to provide what is generally referred to as a series connected single-ended output push-pull amplifier circuit. It should also be pointed out that all of the transistors are of like conductivity for example, NPN as shown, further providing what is known as noncomplementary push-pull amplifier. The single ended output configuration as shown in FIG. 1 eliminates the need for an output transformer and the load 22 can be directly connected to the circuit.

As has been stated in the objects, the purpose of the invention is to provide a balancing circuit for causing the respective collector currents of the transistor to be substantially equal irrespective of large differences in the forward current gain (beta) of the transistors utilized. This is accomplished by the use of the transformers 15, 25, and 35 connected in the manner heretofore described.

As noted, windings 16, 17 and 18 of transformer 15 are wound on a single or a common core and the same may be said with respect to the windings associated with transformers 25 and 35. The purpose of winding the three windings on a single core in each push-pull transistor pair, for example transistor 10A and 10B avoids saturation of the core and therefore allows smaller cores to be used in fabricating the transformers.

Assuming now for purposes of explanation that all transistors 10A and 10B, 20A and 20B, and 30A and 30B are substantially identical, i.e., they have equal betas. The collector currents flowing therein during alternate half cycles when an input signal is applied to the primary winding 41 will be identical and the voltages appearing across the respective transformer windings will be substantially equal. It should be noted, for example, with respect to transformer 15 that the collector currents of transistors 10A and 10B will flow through windings 16 and 17 respectively in opposite directions with respect to winding polarity. This serves to eliminate the saturation effects noted. Since all of the currents are equal, the respective voltages across the windings 18, 28 and 38 will be equal and zero since they are connected in a series aiding configuration and the summation of the voltages around the loop formed thereby must be zero satisfying Kirchoff's law which states that the summation of voltages around a closed loop must be equal to zero. The voltages appearing across windings 16 and 17, 26 and 27, and 36 and 37 will be equal and very small since they will be due to leakage reactance and winding resistance only.

Assuming now that one of the transistors, for example transistor 10A, is removed and is replaced with one having a current gain (beta) that is somewhat higher than the betas of the other transistors such that there is now a tendency for the collector current drawn by transistor 10A to be higher than that of the others during its respective half cycle during which current flows. In this condition, the additional current flowing through winding 16 will induce an incremental voltage in the winding 18. The polarity of this incremental voltage across winding 18 will be such as to cause a current flow in the closed series loop of winding 18, 28 and 38 which will induce counter E.M.F. in the windings 26 and 36 which will increase the drive signal (base-to-emitter voltage) on transistors 20A and 30A causing them to draw more collector current. This increase in collector currents is sensed in the series loop to generate a counter E.M.F. in winding 16 which will reduce the collector current in transistor 10A. This process continues until equilibrium is reached. What in effect happens is that the transistor causing the unbalance provides a current to the respective transformer winding connected to its emitter which generates a voltage which will increase the drive on the other transistors but in turn the drive on the transistor causing the unbalance is reduced. This operation is cumulative such that all of the transistors are forced into carrying substantially equal collector currents regardless of their betas. Likewise, if for example transistor 30B were replaced with a transistor having a beta substantially different from the others the collector current flowing through winding 37 of transformer 35 would generate a voltage in winding 38 which would in turn cause E.M.F.'s to be generated in windings 27 and 17, respectively which would alter the collector currents of transistors 20B and 10B respectively, to cause substantially equal collector currents in all the transistors.

If the transformers 15, 25 and 35 were ideal transformers, the circuit would be satisfied only if all the currents were exactly equal. With actual transformers, however, there is a difference of current between the transistors mainly due to the magnetizing current required by the transformer. In practice, it has been found that this magnetizing current can be extremely small because the voltage appearing across the transformer need only be a fraction of a volt to cause large changes in collector currents. Furthermore, it is noted the push-pull pairs for example transistors 10A and 10B tend to cause saturation in opposite direction of its respective core.

The subject invention is particularly useful where a Class B, C, and S amplifier is desired because the D.C. current flowing is determined by the A.C. component of the collector current so that A.C. balance causes a D.C. balance. Although the subject invention can be operated Class A, when desirable, the circuit will balance only the A.C. component of collector current, not the D.C.

Directing attention now to FIG. 2 there is illustrated an alternate embodiment of the subject invention. This embodiment is essentially identical with the embodiment shown in FIG. 1 except that the load 22 of FIG. 1 has been replaced by a load 42 comprising a circuit combination comprising a resistor 31, a capacitor 32 and an inductor 33 connected in series across the output terminals 23 and 24. This circuit combination may be representative of a high Q antenna tuned to the desired frequency of radiation. Resistor 31 represents all of the resistance of the circuit, including for example, the saturation resistance of the semiconductors, all loss resistance and the radiation resistance. Inductor 33 is the tuning inductance plus the small inductance of the antenna and capacitor 32 is the antenna capacity. Instead of illustrating a D.C. power source, a terminal 21 is illustrated to which the positive terminal of a power supply having its common side returned to ground is connected. Another difference from the embodiment shown in FIG. 1 is that the end terminals (dot) of windings 17, 27 and 37 are commonly connected to ground instead of being returned to the negative terminal of a D.C. supply source. In all other respects, the circuit is identical to the embodiment shown in FIG. 1. The second D.C. supply (D.C. source 13 in FIG. 1) is eliminated due to the fact that when an input signal is applied to input transformer primary winding 41, the collector currents flowing through transistors 10A, 20A and 30A into the load 42 does not have a D.C. path to ground and so as a result an average D.C. potential is built up across the load capacitor 32 which is capable of supplying the necessary collector supply voltage for transistors 10B, 20B and 30B. The operation of the embodiment of FIG. 2 is with respect to the current balancing caused by the transformers 15, 25 and 35 is identical to that described with respect to the embodiment of FIGURE 1.

What has been described therefore is a circuit for balancing the collector currents or load currents of a push-pull parallel amplifier operating into a common load.

Although the present invention has been described with a certain degree of particularity, it should be understood that the present disclosure has been made only by way of example and that numerous changes in the detail of the circuitry may be resorted to without departing from the spirit and scope of the present invention.

What we claim is:

1. A push-pull parallel amplifier including current balancing means comprising in combination: a plurality of signal translation devices coupled together to form a plurality of push-pull circuits connected in parallel circuit relationship; input means for coupling an input signal to each side of said plurality of push-pull circuits; a common load circuit coupled in series circuit relation with each said push-pull circuit; transformer means for each of said plurality of push-pull circuits, each said transformer means including a first, a second, and a third winding, said first and said second windings being coupled to respective sides of this push-pull circuit to be responsive to the current flow therein, and means connecting said third winding of each said transformer means in a series circuit relationship with a proper polarity sense with respect to said first and said second winding to generate a feedback voltage to balance the load current of said plurality of devices.

2. A semiconductor amplifier circuit comprising in combination: a plurality of push-pull circuits coupled together in parallel circuit relationship, each push-pull circuit including at least two semiconductor devices having preselected like semiconductivity coupled to provide a single ended output; input means for coupling an input signal to said plurality of push-pull circuits; a common load circuit coupled to said single ended output for developing an output signal thereacross; and a current transformer respectively associated with each of said plurality of push-pull circuits, said transformer comprising multiple windings with one winding being coupled into each side of each push-pull circuit, said one winding being responsive to the current flow therethrough, and means connecting a third winding in said current transformer associated with each push-pull circuit in a series aiding circuit exclusive of said load circuit for forcing said plurality of push-pull circuits to provide substantially equal current to said common load.

3. A semiconductor parallel amplifier circuit comprising in combination: a plurality of push-pull amplifier circuits coupled together in parallel, each push-pull amplifier circuit comprising a pair of non-complementary transistors coupled together in series; input means for applying an input signal simultaneously to all of said plurality of push-pull amplifier circuits; a common load circuit coupled to said plurality of push-pull amplifier circuits providing a single ended output and developing an output signal thereacross; and transformer means respectively associated with each of said plurality of push-pull circuits, said transformer means having at least a first, a second, and a third winding mutually coupled together, including means connecting said first and said second winding in series with a respective emitter electrode of said pair of non-complementary transistors and being connected in a predetermined polarity sense, and means connecting said third winding of each current transformer in a series circuit exclusive of said load circuit and in said predetermined polarity sense with respect to said first and said second winding for sensing current balance and generating a control voltage to cause current balance should unbalance occur.

4. In combination: a plurality of push-pull circuits coupled together in parallel circuit relationship, each push-pull circuit comprising a pair of transistors of like conductivity coupled together in series circuit relationship; input means coupled to said plurality of push-pull circuits for applying an input signal thereto; a common load circuit coupled to said each push-pull circuit to provide a single ended output, said load circuit including a series inductance-capacitance circuit combination developing an output signal thereacross; and transformer means associated with each push-pull circuit, said transformer means including at least three windings mutually coupled together on a common core; means respectively coupling a first winding into one side of said push-pull circuit and the second winding in the other side of said push-pull circuit with said first and second windings being connected respectively to the emitter electrodes of said transistors and being connected thereto in the same polarity sense with respect to each other; and means connecting the third winding of each transformer means in a series circuit in a like polarity sense with respect to said first and second windings with all said third windings being connected in an aiding polarity sense.

5. In combination: a plurality of push-pull amplifier circuits connected together in parallel circuit combination, each push-pull circuit comprising a pair of transistors coupled in series across a source of potential; input means coupled to each push-pull circuit for applying an identical input signal thereto; a common load circuit coupled to all of said plurality of push-pull amplifier circuits providing a single ended output configuration; a current transformer associated with each push-pull circuit, said transformer having at least three windings wound on a single core; circuit means connecting one winding of said at least three windings in the emitter circuit of one of said pair of transistors in said push-pull circuit; means connecting a second winding of said at least three windings in the emitter circuit of the other transistor of said push-pull circuit, and circuit means interconnecting a third winding of said at least three windings respectively to the respective third winding of other said transformers associated with each other push-pull circuit, said third windings being connected in a series aiding circuit exclusive of said load circuit.

References Cited by the Examiner

UNITED STATES PATENTS

| | | | |
|---|---|---|---|
| 2,536,651 | 1/1951 | Merhaut | 330—84 |
| 2,875,284 | 2/1959 | Ehret | 330—30 |
| 2,941,154 | 6/1960 | Rogers | 330—30 X |
| 3,046,488 | 7/1962 | McVey | 330—30 |
| 3,096,486 | 7/1963 | Atherton | 330—30 X |

FOREIGN PATENTS

| | | |
|---|---|---|
| 129,238 | 9/1960 | Russia. |

ROY LAKE, *Primary Examiner.*

F. D. PARIS, *Assistant Examiner.*